(12) United States Patent  
Haggerty

(10) Patent No.: US 7,135,116 B2  
(45) Date of Patent: Nov. 14, 2006

(54) PROCESS FOR RECOVERY OF NUTRIENTS FROM WASTEWATER

(76) Inventor: Kenneth Haggerty, 37 Hi Mount Drive, Willowdale, Ontario (CA) M2K 1X3

(*) Notice: Subject to any disclaimer, the term of this patent is extended or adjusted under 35 U.S.C. 154(b) by 0 days.

(21) Appl. No.: 10/419,848

(22) Filed: Apr. 22, 2003

(65) Prior Publication Data

US 2003/0196965 A1 Oct. 23, 2003

(30) Foreign Application Priority Data

Apr. 22, 2002 (CA) .................................... 2382813

(51) Int. Cl.
*C02F 1/20* (2006.01)
*C02F 1/58* (2006.01)

(52) U.S. Cl. .................. 210/632; 71/12; 71/21; 71/42; 210/631; 210/710; 210/718; 210/724; 210/726; 210/903; 210/906

(58) Field of Classification Search .................. 71/12, 71/13, 21, 42; 210/631, 710, 718, 724, 726, 210/903, 906; 95/263
See application file for complete search history.

(56) References Cited

U.S. PATENT DOCUMENTS

| 3,989,622 A | * | 11/1976 | Marantz et al. ............. 210/645 |
| 4,657,680 A | * | 4/1987 | Zibrida ....................... 210/713 |
| 4,765,900 A | * | 8/1988 | Schwoyer et al. .......... 210/603 |
| 5,186,842 A | * | 2/1993 | Jolly .......................... 210/763 |
| 5,294,348 A | * | 3/1994 | Horny et al. ................ 210/724 |
| 5,531,907 A | * | 7/1996 | Williams et al. ............ 210/727 |
| 6,344,141 B1 | * | 2/2002 | Vandenbergh et al. ...... 210/611 |
| 6,379,546 B1 | * | 4/2002 | Braun ......................... 210/607 |
| 6,409,788 B1 | * | 6/2002 | Sower ........................... 71/11 |
| 6,692,642 B1 | * | 2/2004 | Josse et al. ................. 210/605 |
| 7,014,768 B1 | * | 3/2006 | Li et al. ..................... 210/603 |

* cited by examiner

*Primary Examiner*—Peter A. Hruskoci
(74) *Attorney, Agent, or Firm*—Katten Muchin Rosenman LLP

(57) ABSTRACT

The present invention relates to a process for treating a wastewater comprising an ammonium ion species and a phosphorus ion species. The process comprises the steps of: (i) treating the effluent in a first stage of the process to convert the phosphorus to a phosphorus-containing salt; (ii) treating the wastewater in a second stage of the process to convert the ammonium ion species to gaseous ammonia; (iii) removing the struvite and/or other phosphorous containing salts from the effluent; and (iv) removing the gaseous ammonia from the wastewater.

18 Claims, 6 Drawing Sheets

PROCESS FOR RECOVERY OF NUTRIENTS FROM WASTEWATER

BACKGROUND OF THE INVENTION

1. Field of the Invention

The present invention relates to a process for recovery of nutrients from a wastewater. As used through out this specification, the term "wastewater" is intended to any wastewater contain ammonia (also referred to in this specification as "ammonium species") and phosphorus. Non-limiting examples of wastewaters which may be treated using the present process include water borne waste flow of human domestic, industrial, commercial or agricultural origin.

2. Description of the Prior Art

The need to protect natural waters from excessive concentrations of nitrogen (N) and phosphorous (P) is well documented and widely accepted. Most jurisdictions in developed countries regulate the concentration of N and P which can be released into receiving waters.

The prior art includes the development of numerous technological advances which purportedly effect these controls.

Generally, the prior art advances fall into the categories of: (i) diversion for land application (DFLA) for use as fertilizer, or (ii) conversion to an innocuous form. For anthropogenic wastes, DFLA is only practiced in a few instances in developed countries using urine from specialized waste-separating toilets. DFLA is the primary choice for disposal of agricultural wastes. When dealing with liquid wastes from anthropogenic sources, soluble N is biologically converted to nitrogen gas through the processes of nitrification and denitrification (NDN); and P is generally converted by complexing with an aluminum or iron salt to form an insoluble and biologically unavailable precipitate. Other rarely used, but available solutions are: a commercial process for recovering P as calcium phosphate, adjusting the pH and dosing the wastewater containing ammonia with phosphorous and magnesium to cause struvite precipitation, and raising the pH and stripping the ammonia in a column.

Despite the advances made in the art, there is still room for improvement. For example, the disadvantages of the current state of the art lie with the considerable volume and energy requirements which are inherent in the processes. Specifically, DFLA requires large storage volumes for the resultant fertilizer products since it is only possible to make agricultural applications one or two times per year. Further, this approach is accompanied by the release of undesirable odors; both from the storage facilities, and when the wastes are applied to the land. Still, further depending on temperature and soil moisture, a considerable fraction of the applied ammonia may be lost by volatilization.

DFLA is energy intensive as a form of fertilizer application in that it is a separate process and is not combined with other tillage activities. DFLA does not allow the control of the fertilizer composition and its application must be regulated to prevent overloading of the soils with particular constituents (e.g., P). Further, DFLA often involves considerable transport costs when relatively dilute materials are transported long distances. This often leads to over application, and consequential problems with overland runoff. This is estimated to contribute as much as two-thirds of the surface water pollution in the USA.

Conversion of ammonia by NDN requires large volumes in the treatment plants, considerable expenditure of energy for aeration, and more elaborate process control over and above that required for simple organics removal. In many instances an electron acceptor such as methanol must be added at extra expense to facilitate denitrification. Additionally a valuable fertilizer is destroyed rather than being recovered for reuse.

P sequestering generally results in considerable additional sludge being generated when metal salts are added due to co-precipitation of other naturally occurring species in addition to the P. This sludge must be treated and then transported to a disposal site. A potentially useful mineral is turned into a waste product rather than being diverted for use as fertilizer.

Thus, despite the advances made to date, there is still considerable room for improvement.

SUMMARY OF THE INVENTION

It is an object of the present invention to obviate or mitigate at least one of the above-mentioned disadvantages of the prior art.

It is another object of the present invention to provide a novel process for the recover of nutrients from a wastewater effluent.

Accordingly, the present invention provides a process for treating a wastewater comprising an ammonium ion species and a phosphorus species, the process comprising the steps of:

(i) treating the effluent in a first stage of the process to convert the phosphorus to a phosphorus-containing salt;

(ii) treating the effluent in a second stage of the process to convert the ammonium ion species to gaseous ammonia;

(iii) removing the phosphorus-containing salt from the effluent; and (iv) removing the gaseous ammonia from the effluent.

As will be apparent to those of skill in the art, Step (i) may be performed before or after Step (ii), and Step (iii) may be performed before or after Step (iv).

In another of its aspects, the present invention provides a process for pre-treatment of a fluid comprising urine, the process comprising the steps of: (i) dissociating the fluid within 14 days of production of the urine, and (ii) adding a base to the to raise the pH thereof. Preferably, the pretreated fluid this then further processed using the process described in the previous paragraph.

Thus, in accordance with the present process, ammonia and phosphorus may be removed from wastewater by employing a combination of physical-chemical and biological processes which allows these nutrients to be recovered in concentrated form for subsequent use as fertilizer. In most cases, the P removal process is concentration dependant, in that P removal to less than 0.5 mg P/L is a function of pH, ammonia and magnesium concentration. The ammonia removal process can be applied to effluents at virtually any concentration. However, the higher the initial concentrations of ammonia and phosphorus; the more efficient the process is, resulting in the ability to utilize a smaller device, and proportionately less chemicals to produce the requisite outflow concentration—this is an advantage of the present process.

BRIEF DESCRIPTION OF THE DRAWINGS

Embodiments of the present invention will be described with reference to the accompanying drawings, wherein like reference numerals denote like parts, and in which.

DETAILED DESCRIPTION OF THE PREFERRED EMBODIMENTS

Figure 1:
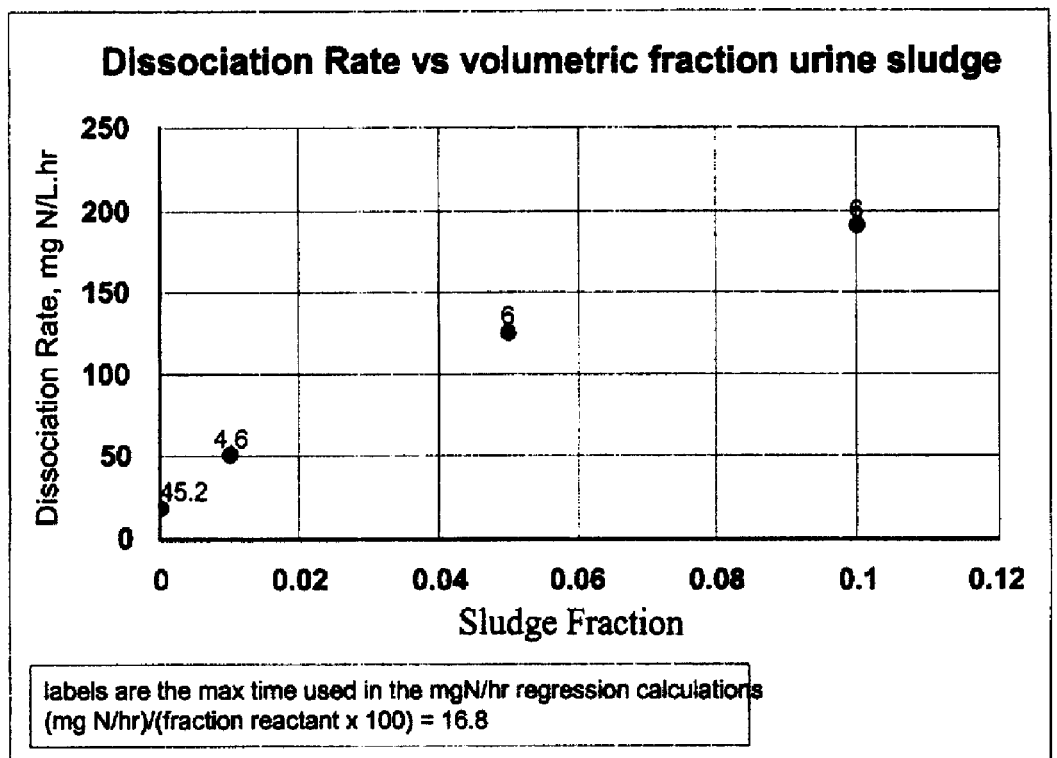
FIGS. 1–8 illustrate various graphs depicting various results from experimental work done in relation to a preferred embodiment of the present process.

In accordance with a preferred embodiment of the present process, the economical separation, collection, and removal of ammonia and phosphorous from a wastewater is facilitated by diverting the portion of the wastewater containing the majority of these species and treating it to effect removal of ammonia and phosphorus prior to dilution by mixing with other wastewater, if any, for final treatment.

Preferably, in process for treating a wastewater comprising an ammonium ion species and a phosphorus species, it is highly preferred that Steps (i) and (ii) are conducted substantially sequentially.

The phosphorus removal process relates to the fact that ammonia, magnesium and phosphate ions combine in the molar ratio of 1:1:1 to form a relatively insoluble salt called struvite ($NH_4MgPO_4.6H_2O$) at a pH of about 8.4 or higher. The theoretical optimum pH being in the range between 10.0 and 10.7. In instances where magnesium concentration in the wastewater effluent is a limiting factor, a source of magnesium (e.g., $MgCl_2$, $MgO$ and the like, most preferably $MgCl_2$) is added and mixed with the wastewater, the pH is raised to approximately 8.5 or greater and the resultant struvite crystals settle from the solution. The N and P in struvite is available to plants to meet their nutrient requirements. As the pH is increase the P may also combine with other species present in the wastewater (e.g. $Ca^{++}$, or $Fe^{++}$) to form insoluble salts The ammonia removal process (in addition to that removed by struvite formation) relates to the the gas fraction of ammonia in water increasing with increasing pH. The unionized fraction of ammonia present in water is:

$$\frac{[NH_3]}{[NH_3]+[NH_4^+]} = f = (10^{pka-pH} + 1)$$

wherein pKa=0.09018+2729.92/T and T=ambient water temperature in Kelvin (K=° C.+273.6). This relationship dictates that, at relatively low pH, the ammonia is largely ionized, whereas at high pH it is largely in the gaseous state. For example at 20° C. and pH=1, $f=4\times10^{-9}$ whereas at pH=10 and 12, f=0.80 and 0.997, respectively.

At pH of 10 or greater, the ammonia is readily stripped from the solution by the employment of a device which provides a large liquid covered surface area combined with high gas flows. A packed column, a Rotating Transfer Disk™ (RTD), or a Spiral Contactor™ (SC), are examples of devices which may be used to strip the ammonia. The gas containing the stripped ammonia may be circulated to another chamber and passed over a separate reactor containing a surface which is covered with a low pH liquid (preferably, pH less than about 1.2 such as 0.5 N $H_2SO_4$). The ammonia dissolves in, or chemically combines with, this liquid, and the carrier gas may then be returned to the basic side device containing the ammonia laden water for further continuous removal of the ammonia.

The process may be applied to any wastewater containing ammonia (also referred to in this specification as "ammonium species") and phosphorus. The preferred application of present process described herein relates to wastewaters of either anthropogenic, agricultural or of organic decomposition origin.

Preferably, prior to the treatment with the present process, the wastewater is subjected to anaerobic treatment which facilitates dissociation of the urea and release of organically stored ammonia and phosphorous from organic solids in the wastewater. For systems treating anthropogenic wastes, the toilet wastes (blackwater) are preferably concentrated by using either a double flush toilet which has a smaller flush volume for urine removal than is required for feces removal, or a waste separating toilet with the separated wastes recombined immediately downstream of the toilet. Preferably, the present process is used to treat these streams for phosphorous and nitrogen removal separately from the other residential wastewater—i.e., treat the blackwater separate from the greywater before combining them for biological aerobic treatment. Alternatively the separated urine may be treated separately from the other waste flow stream. A consequential side benefit of this arrangement is that the toilet flush water is approximately ⅓ to ½ of that for a conventional toilet and overall household flow is accordingly reduced by between 10% and 30%. A further alternative is to use urinals in combination with low flow toilets. Treatment may be undertaken at individual residences, or at centralized facilities served by a collection system. Agricultural wastes and wastes from digesters treating organic wastes are treated as one flow stream.

A preferred embodiment of the present process will be described with reference to treatment of a wastewater stream which consists of urine and feces.

Dissociation

Urine, which contains urea, accounts for 67%–90% of the physiological nitrogen. It dissociates very rapidly in the presence of urease, and dissociation may occur in the collection pipes [see: (i) Sunderman F. W.,1949, Normal Values in Clinical Medicine, W. B. Sanders and Company and (ii) Jönsson H., Stenstron T., Svensson J., and Sundin A., 1997, Source separated urine-nutrient and heavy metal content, water saving and fecal contamination, Wat. Sci. Tech., 35(9), 145–152], or in the anaerobic digester, or specific dissociation device. From a process perspective the urine passes through a reactor wherein the urea dissociates to ammonia and $CO_2$ by way of the following reaction:

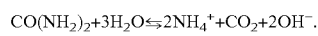

$CO(NH_2)_2+3H_2O \rightleftharpoons 2NH_4^+ +CO_2+2OH^-$.

Figure 2:
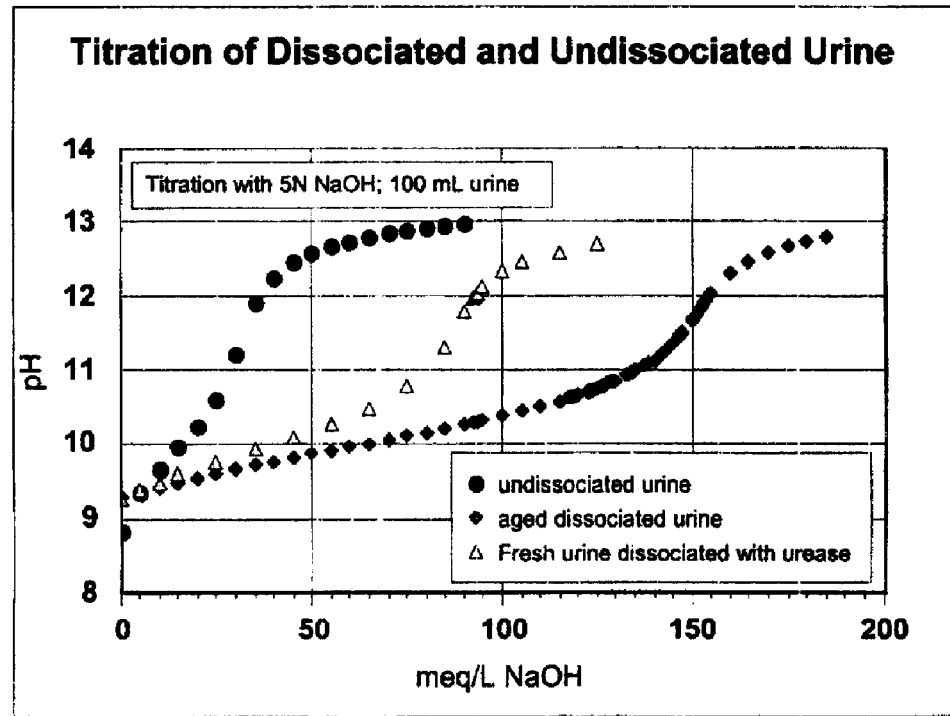
Figure 3:
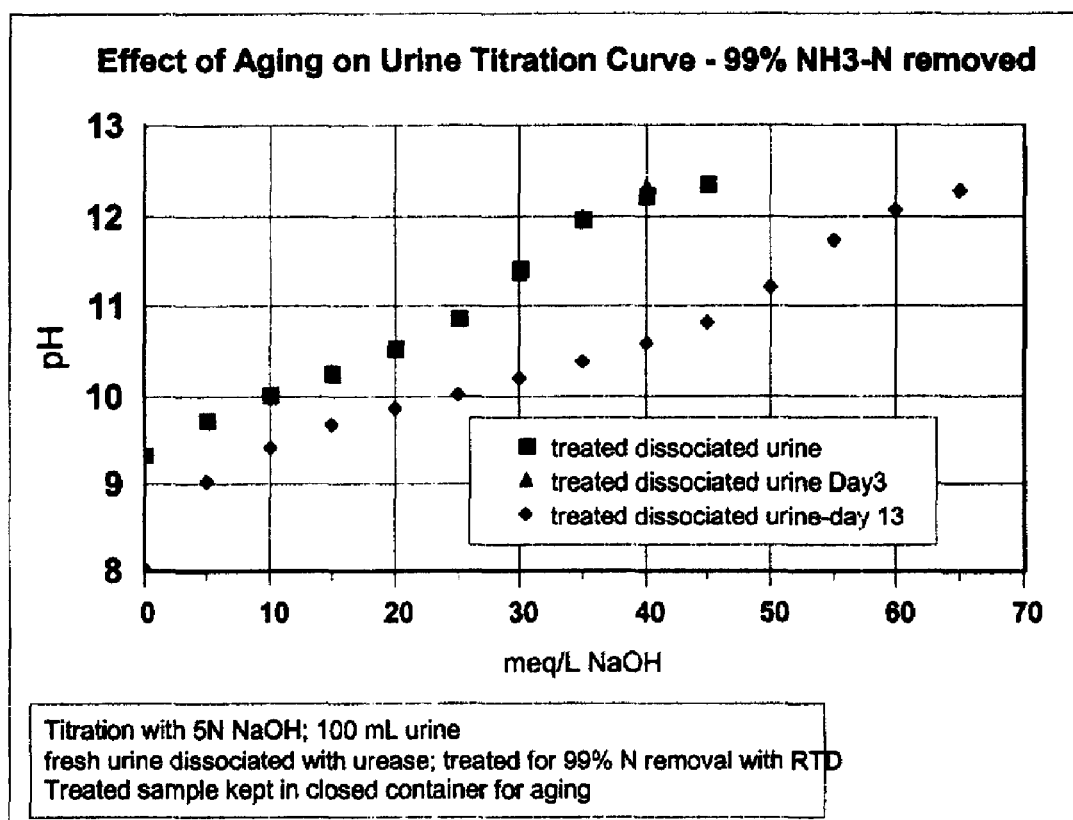

FIG. 1 illustrates the dissociation rate achieved by using a sludge obtained from a container which was used over a substantial period of time to allow urine to dissociate. FIGS. 2 and 3 illustrates a phenomonen which occurs if the urine is treated separately from the degraded feces flow stream for P and N removal. There is a marked advantage to causing its dissociation and treatment before it has been stored for a long period (two weeks) at room temperature, as there appear to be degradation products formed which approximately double the number of equivalents required for pH adjustment.

Formation and Removal of Struvite, Metal Salts, and Organic Precipitates

When the concentration of $Mg^{++}$ is limiting, the flow containing the phosphorous and the dissociated urine may be dosed with magnesium salts (e.g., $MgCl_2$, $MgO$ and the like, most preferably $MgCl_2$), preferably in a turbulent mixing chamber. The pH of the flow stream is raised, preferably to a level in the range of from about 10 to about 10.7. If the P concentration is very high it may be highly preferred that the MgCl$_2$ be added prior to pH adjustment so as to obviate or mitigate precipitate of magnesium as Mg(OH)$_2$ without the formation of struvite. Ammonia and magnesium combine with phosphorous in a 1:1:1 molar ratio to form the mineral struvite the solubility of which is a function of the pH and relative abundance of ammonia and magnesium when P concentration is a limiting factor. The reaction proceeds as follows:

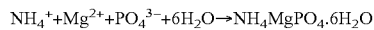

$$NH_4^+ + Mg^{2+} + PO_4^{3-} + 6H_2O \rightarrow NH_4MgPO_4 \cdot 6H_2O$$

and is characterized by a pK$_{sp}$ of 13.26.

Figure 4:
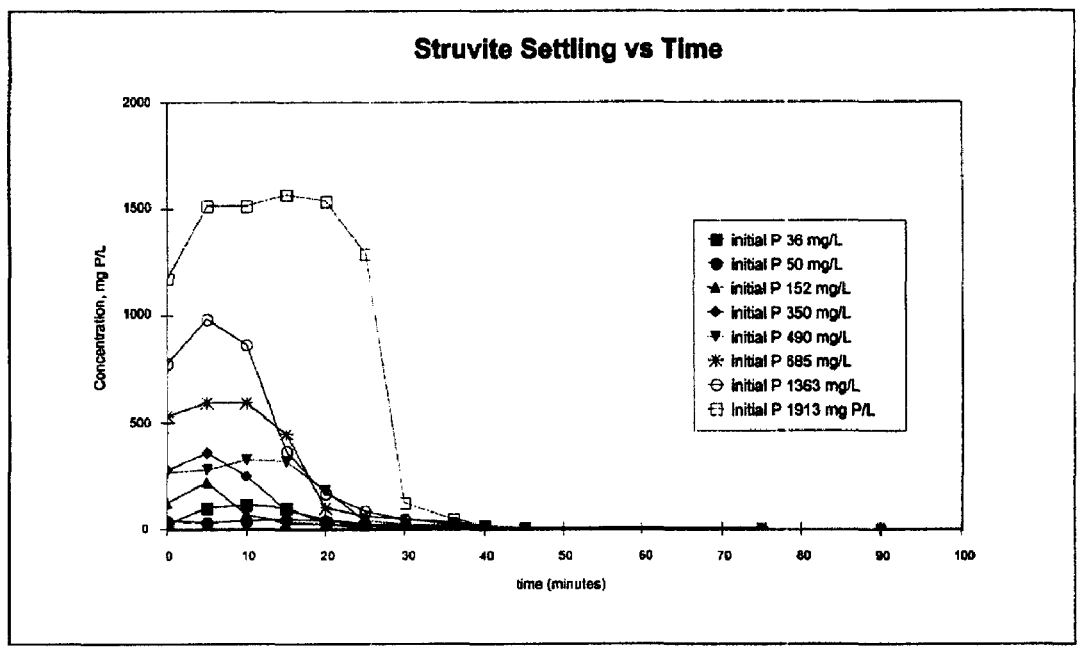

The struvite will form large crystals and/or become enmeshed in flocs and may be removed at this point by settling or other physical separation process. The experimental results are illustrated in FIG. 4 and were generated using a 1.8 m high×1.5 inch diameter Lucite column equipped with a sampling port 1 m from the bottom. The column was dosed with freshly made struvite from artificial urine containing 3400 mg N/L, and Mg:P of 2:1 at pH 9.6, dumped into the column and demonstrates the sweep floc that results in excellent and rapid separation.

Figure 5:
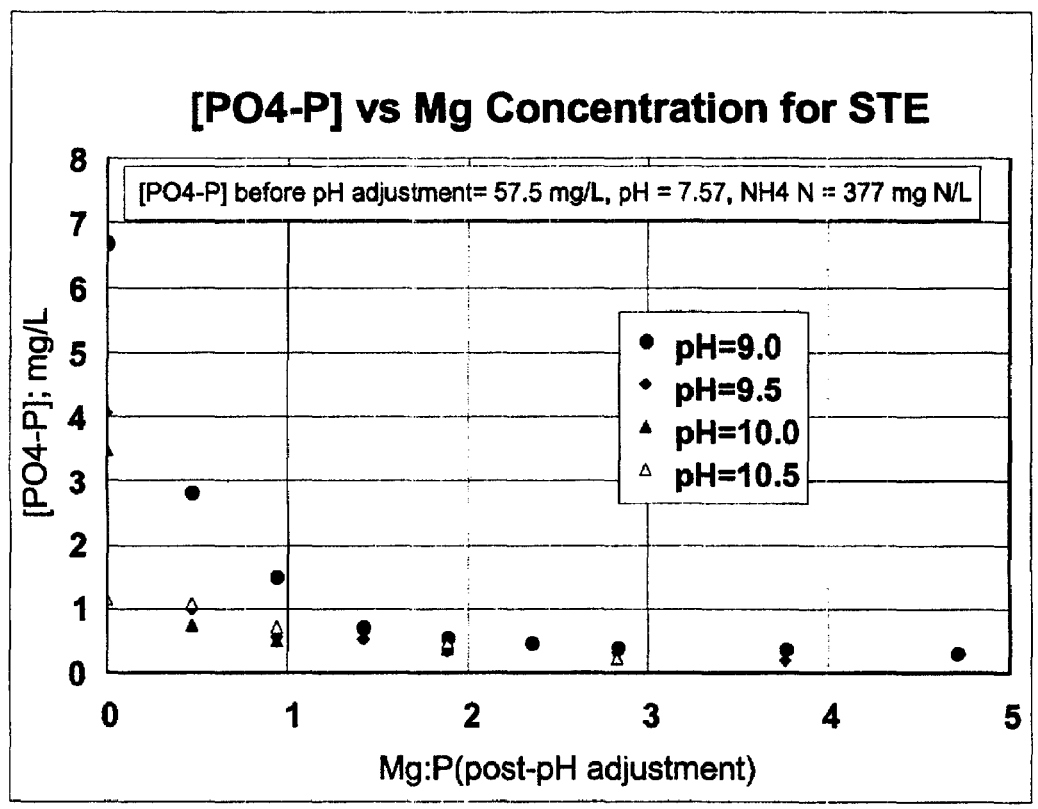

As the pH of the wastewater containing P is raised, insoluble salts in addition to struvite will form. [see Benisch, Neethling, Baur, Role of metals and phosphate crystallization in biological phosphorous removal, WEFTEC 2001]. FIG. 5 shows the effect of increased P removal with increasing pH occurring in septic tank effluent consisting of recombined wastes from a waste separating toilet.

Ammonia Removal

Figure 6:
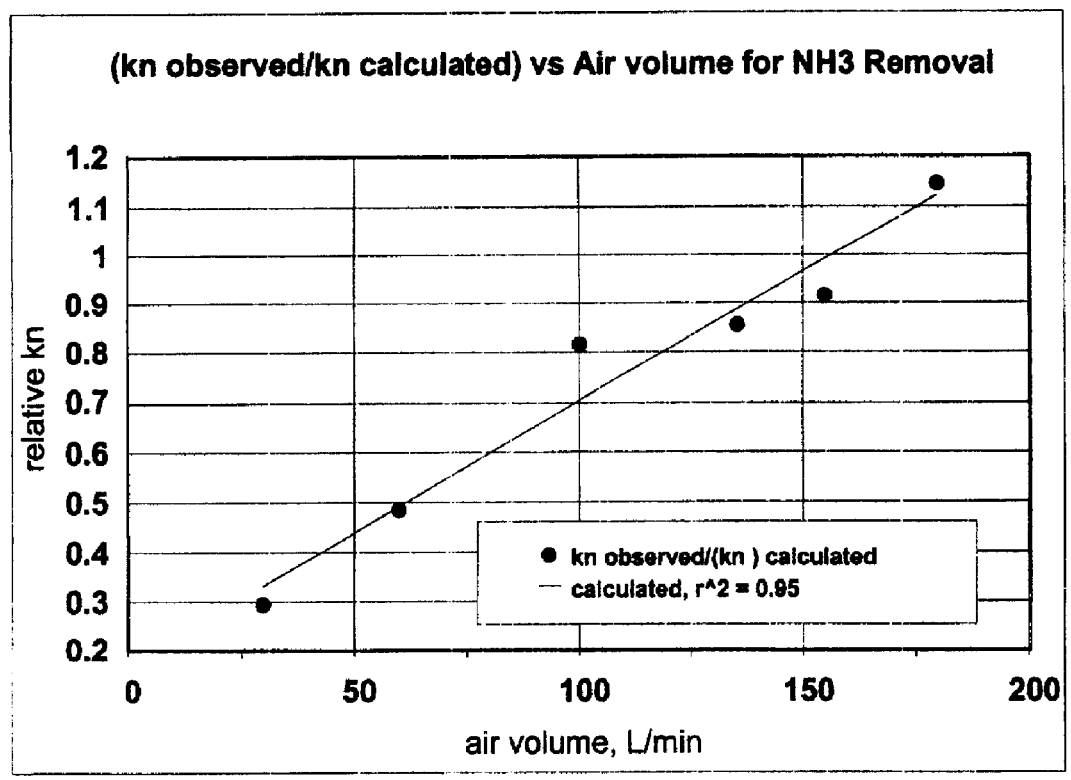

The pH is raised to a level above 10 such that there will be sufficient alkalinity available to supply the necessary equivalents to maintain a pH above 10 as the ammonia dissociates (NH$_4^+$→NH$_3$+H$^+$) and is stripped, preferably inside a closed container. At this pH, the ammonia fraction is largely gaseous ammonia and is readily stripped from the solution. The stripping rate is a function of pH of the ammonia solution, the available surface area of the device, the rate of air flow, and the temperature. The reactor setup may be a packed column operated in co-current or counter current arrangement, an RTD operating as a batch reactor, a CSTR, or a plug flow reactor (PFR), a SC or a spray column. FIG. 6 shows the variation of specific removal rates in an RTD™ in batch mode vs. gas (air) flow.

Ammonia Capture

Figure 7:
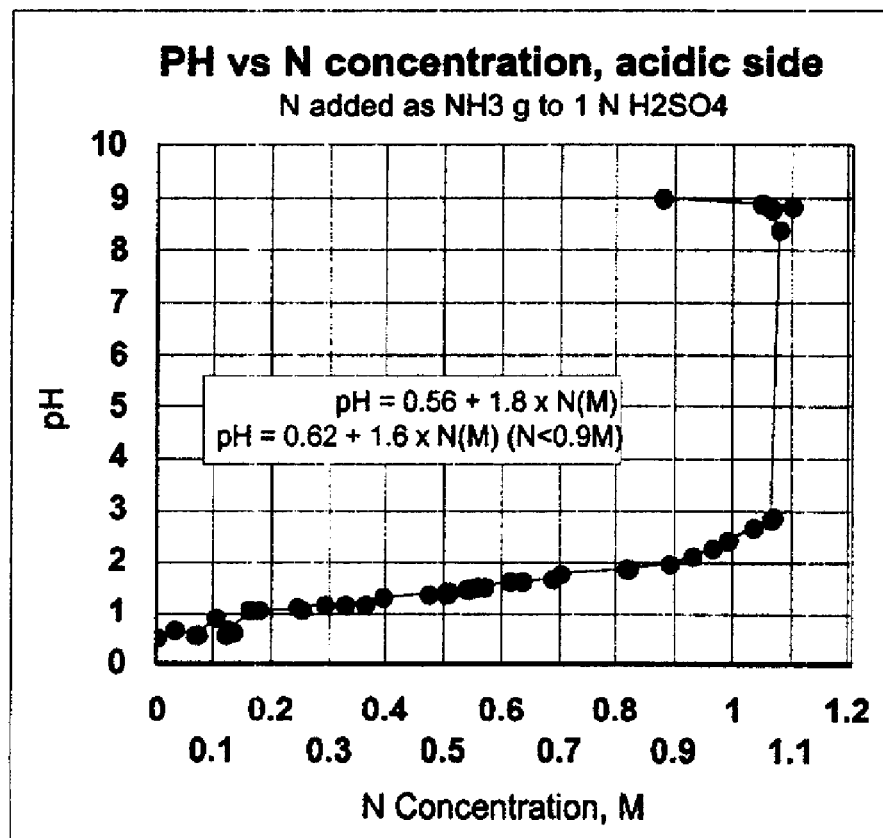

The gas from the stripping device containing ammonia is passed over a surface area containing a liquid with a low pH (preferably in the range of from about 0.5 to about 1.3)—e.g. H$_2$SO$_4$. At this pH, the ammonia gas fraction using the above equation representing the unionized fraction of ammonia present in water varies from 1.3×10$^{-9}$ to 4.0×10$^{-9}$, respectively. The ammonia is adsorbed into the solution which, if it consists, in a preferred embodiment, of from about 0.5 to about 1.0 N sulfuric acid solution, will form ammonium sulfate ((NH$_4$)$_2$SO$_4$), a common form of fertilizer (solubility 754 g/L at 20° C.) As with the stripping device described hereinabove, either a packed column, an RTD™, or SC™, may be used to remove the ammonia from the gas (air) flow. It is highly preferred that the acid concentration be not much greater than 1 N as the adsorption efficiency decreases rapidly. Alternatively when the pH of an H$_2$SO$_4$ solution falls below 0.5 it becomes increasingly hydroscopic with reduced pH. This results in significant water vapor transfer to the acid side of the process. In addition to dilution. volumetric considerations should then be resolved. A continuous supply of acid is highly preferred as the dissolution of the ammonia results in the 1:1 normality consumption of acidity—see FIG. 7.

Figure 8:
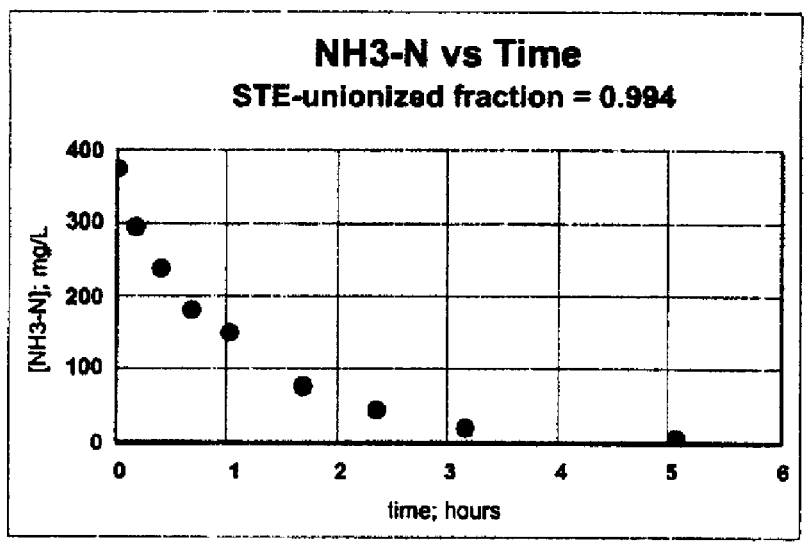

FIG. 8 illustrates the results of treating combined urine and feces wastes as septic tank effluent (STE) from a separating toilet using an RTD in batch mode.

As will be appreciated by those of skill in the art, the present process results in a number of significant advantages and/or alternatives to the specific preferred embodiments described above, including:

(1) The creation of a separate anthropogenic wastewater stream containing high concentrations of ammonia and phosphorous by the means of diverting the flow from devices such as a low flow toilet, a double flush toilet, a waste separating toilet or the combining of flows from urinals with the flows from the above mentioned toilets into a separate flow stream. Alternatively the creation of a separate flow stream containing primarily urine.

(2) The digestion of the flow stream described in (1), or a stream of agriculturally generated wastewater, in order to promote the dissociation of urea and the release of ammonia and phosphorous from organics contained therein. Alternatively the treatment of the flow stream consisting of urine in a contactor containing urease in order to promote the dissociation of urea.

(3) The diversion of a wastewater such as described in (1) and (2) above, or the diversion of the flow stream from an anaerobic reactor, for removal and recovery of phosphorous and stoichiometric amounts of ammonia by means of the addition of magnesium, and adjusting the pH to promote the formation and settling of struvite and other salts containing phosphorous which can be recovered as a solid.

(4) The process can be conducted to cause the diversion of wastewater such as described in (1) and (2) and (3) above; or the diversion of the flow stream from an anaerobic reactor treating organic wastes; for removal and recovery of ammonia by raising the pH of the diverted wastewater to a point well past the equivalence point (usually between 10 and 13) and allowing the solids to be separated and removed in, or before entering, a reactor with a large surface area to promote the volatilization of the ammonia. An alternative process is to subject the wastewater to aerobic biological treatment for removal of organics, but not ammonia prior to raising the pH as described above. The transfer of the gas containing the volatilized ammonia with a fan, a blower or natural convection, to a separate section of the reactor where it is contacted with a large surface area covered with a liquid at low pH which promotes the adsorption and dissolution of the ammonia into the liquid. The subsequent recirculation of the carrier gas back to the section of the reactor containing the pH adjusted, ammonia bearing liquid.

(5) The process can be conducted to maintain the pH on the acidic side of the reactor in a range ideally between 2.5 and 0.1.

(6) The process can be conducted to cause the precipitation of the struvite, mineral salts, and co-precipitation of organic species by means of raising the pH above 8.4, and/or substantially above the equivalence point wherein all of the organic acids are neutralized and the precipitate forms a floc (coagulates).

(7) The process can be conducted to cause removal of the precipitated and coagulated/flocculated struvite, mineral salts and organic species from the waste water by means of settling the floc. Alternatively, the floc may be removed by dissolved air flotation, a hydraulic cyclone device, a centrifuge, or a belt press.

(8) ORP and pH probes to monitor the above described process and control the flow rate of wastewater as well as the flow of acid and base.

While this invention has been described with reference to illustrative embodiments and examples, the description is not intended to be construed in a limiting sense. Thus, various modifications of the illustrative embodiments, as well as other embodiments of the invention, will be apparent to persons skilled in the art upon reference to this description. It is therefore contemplated that the appended claims will cover any such modifications or embodiments.

All publications, patents and patent applications referred to herein are incorporated by reference in their entirety to the same extent as if each individual publication, patent or patent application was specifically and individually indicated to be incorporated by reference in its entirety.

What is claimed is:

1. A process for treating a wastewater effluent of either anthropogenic, agricultural, or organic origin comprising an ammonium ion species and a phosphorus species, the process comprising the steps of:
   (i) treating the effluent in a first stage of the process to convert the phosphorus to a phosphorus-containing salt at a pH of about 8.4 or higher;
   (ii) treating the effluent in a second stage of the process to convert the ammonium ion species to gaseous ammonia, wherein step (ii) comprises regulating the pH of the effluent to be greater than about 10.0;
   (iii) removing the phosphorus-containing salt from the effluent; and
   (iv) stripping the gaseous ammonia from the effluent at the pH of step (ii) with a carrier gas in a device providing a liquid covered surface area.

2. The process defined in claim 1, wherein Step (i) and Step (ii) are conducted sequentially.

3. The process defined in claim 1, wherein Step (i) is conducted prior to Step (ii).

4. The process defined in claim 1, wherein Step (ii) is conducted prior to Step (i).

5. The process defined in claim 1, wherein Step (i) comprises the steps of:
   contacting the effluent with magnesium chloride, and regulating the pH of effluent to be in the range of from about 8.4 to about 10.7.

6. The process defined in any one of claims 1,2,3,4, and 5 wherein Step (iii) comprises allowing the phosphorus-containing salt to settle and thereafter decanting substantially phosphorous-free liquid.

7. The process defined in any one of claims 1,2,3,4, and 5 wherein Step (ii) comprises regulating the pH of the effluent to be in the range of from about 11 to about 13.

8. The process defined in any one of claims 1,2,3,4, and 5 further comprising the step of recovering the ammonia.

9. The process defined in claim 8, further comprising the step of converting the recovered ammonia to a fertilizer material.

10. The process defined in any one of claims 1,2,3,4, and 5 wherein the wastewater comprises urine.

11. The process defined in any one of claims 1,2,3,4, and 5 wherein the phosphorus-containing salt comprises struvite.

12. The process defined in any one of claims 1,2,3,4, and 5 wherein Step (iii) is conducted before Step (iv).

13. The process defined in any one of claims 1,2,3,4, and 5 wherein Step (iv) is conducted before Step (iii).

14. The process defined in claim 1, further comprising:
   the preliminary step of separating the wastewater into streams based on nutrient content; and
   the step of concentrating recovered nutrients, including phosphorus and ammonia, in a form suitable for use as a fertilizer.

15. The process defined in claim 14, further comprising a preliminary step of separating streams of anthropogenic waste based on their nutrient concentration.

16. The process defined in claim 15, further comprising the step of treating the separate streams to promote dissociation of nutrients.

17. The process defined in claim 16, wherein the preliminary step of separating streams of anthropogenic waste comprises diverting separate urine and blackwater streams, and the step of treating the separate streams comprises:
   (i) treating the urine stream to promote dissociation of urea; and
   (ii) treating the blackwater stream to release organically stored ammonia and phosphorous.

18. The process defined in claim 17, wherein the step of treating the urine stream to promote dissociation of urea is performed within 14 days of production of the urine and includes one or both steps of (i) adding urease to the urine stream; and (ii) passing the urine stream through a sludge.

* * * * *